United States Patent [19]

Monzer

[11] Patent Number: 4,734,335
[45] Date of Patent: Mar. 29, 1988

[54] MULTILAYER FILM FORMED OF POLYESTER AND HAVING A CORE LAYER SUITABLE FOR THERMOPLASTIC EMBOSSING

[75] Inventor: Helmut Monzer, Wiesbaden, Fed. Rep. of Germany

[73] Assignee: Hoechst AG, Frankfurt, Fed. Rep. of Germany

[21] Appl. No.: 937,106

[22] Filed: Sep. 18, 1985

Related U.S. Application Data

[63] Continuation of Ser. No. 566,898, Dec. 29, 1983, abandoned.

[30] Foreign Application Priority Data

Dec. 30, 1982 [DE] Fed. Rep. of Germany ....... 3248670

[51] Int. Cl.$^4$ .............................................. B32B 27/36
[52] U.S. Cl. ................................... 428/480; 428/482; 428/910
[58] Field of Search ............... 428/172, 910, 480, 482, 428/35, 36

[56] References Cited

U.S. PATENT DOCUMENTS

| | | | |
|---|---|---|---|
| 2,719,100 | 9/1955 | Banigan | 428/910 X |
| 3,000,754 | 9/1961 | Zentmajer | 428/910 X |
| 3,900,653 | 8/1975 | Riboulet et al. | 428/910 X |
| 4,011,358 | 3/1977 | Roelofs | 428/910 X |
| 4,086,388 | 4/1978 | Brown | 428/172 X |
| 4,198,458 | 4/1980 | Mitsuishi et al. | 428/910 X |
| 4,263,364 | 4/1981 | Seymour et al. | 428/287 |
| 4,456,639 | 6/1984 | Drower et al. | 428/172 X |

FOREIGN PATENT DOCUMENTS 1115713 5/1968 United Kingdom .

Primary Examiner—Nancy A. B. Swisher
Attorney, Agent, or Firm—James C. Lydon; Richard L. Schwaab

[57] ABSTRACT

The present invention relates to a three-layer film formed of polyesters, which is preferably produced in a coextrusion process. The film is suitable for embossing and does not tend to stick to the embossing tool, even at elevated temperatures. Under a thermal load which is necessarily applied in the further processing of the film, the depth of embossing is not changed or is only negligibly changed. The three-layer film formed of polyesters has external layers with higher melting points than the intermediate layer. Preferably, the external layers comprise polyethylene terephthalate and the intermediate layer of copolyester.

7 Claims, 2 Drawing Figures

EMBOSSED FOIL
EMBOSSING THERMAL STABILITY UP TO 200°C

FOIL WHICH CAN BE EMBOSSED AT 120-200°C WITHOUT STICKING TO THE TOOL.

EMBOSSED FOIL
EMBOSSING THERMAL STABILITY UP TO 200°C

MULTILAYER FILM FORMED OF POLYESTER AND HAVING A CORE LAYER SUITABLE FOR THERMOPLASTIC EMBOSSING

This application is a continuation of Ser. No. 566,898 filed Dec. 29, 1983, now abandoned.

BACKGROUND OF THE INVENTION

The present invention relates to an embossable biaxially stretched and heat-set multilayer film formed of polyesters having different melting points. The invention further relates to a process for the production of this multilayer film.

U.S. Pat. No. 3,871,947 discloses an integral heat-set biaxially oriented composite film, made up of a transparent polyethylene terephthalate layer, which has a smooth exposed major surface, and a transparent copolyester layer which is arranged on the polyethylene terephthalate layer and has a matte exposed major surface.

The material described in U.S. Pat. No. 3,871,947 is, in the first place, intended for use as a backing for pressure-sensitive adhesive tapes. The matte copolyester surface of the film forms a surface which is suitable for drafting and writing thereon.

SUMMARY OF THE INVENTION

It is, however, an object of the present invention to provide an improved embossing film, which cannot be produced according to the above-mentioned prior art, since the copolyester described therein tends to stick to the rolls which are used to produce the embossed film, even at low temperatures (see Table 3 below).

It is also an object of the present invention to provide an embossing film which is capable of being embossed at higher temperatures, so that the depth of embossing is maintained, even when the film is subjected to load at elevated temperatures, which may be necessary in the further processing thereof.

Still another object of the invention resides in the provision of a process for preparing the improved embossing film according to the invention.

In accomplishing the foregoing objects, there has been provided in accordance with one aspect of the present invention, an embossable, biaxially stretched and heat-set multilayer film, comprising two external layers comprised of a first polyester composition and, sandwiched between the external layers, a core layer comprised of a second polyester composition having a lower-melting temperature than the first polyester composition, whereby the film can be embossed at higher temperatures and substantially maintains the resulting depth of embossing in a thermal treatment which may be necessary for the further processing of the film after embossing. The depth of embossing of the film is therefore maintained up to a temperature range which corresponds to the melting range of the second polyester composition. Also provided is a film which is embossed on at least one side to form a non-planar pattern. In such a film, it is preferred that the external polyester layer on which embossing is effected is thinner than the external polyester layer on the side opposite to the layer on which embossing is effected.

In accordance with another aspect of the invention, there has been provided a process for the production of the film as defined above, comprising the step of coextruding a pre-film having said three layers, biaxially stretching the pre-film and subsequently heat-setting the biaxially stretched film. To make the embossed film, the process further comprises the step of contacting the heat-set film with a textured surface under a pressure sufficient to transfer the texture of the surface to the three-layer film.

Further objects, features and advantages of the present invention will become apparent from the detailed description of preferred embodiments which follows.

DETAILED DESCRIPTION OF PREFERRED EMBODIMENTS

Figure 1:
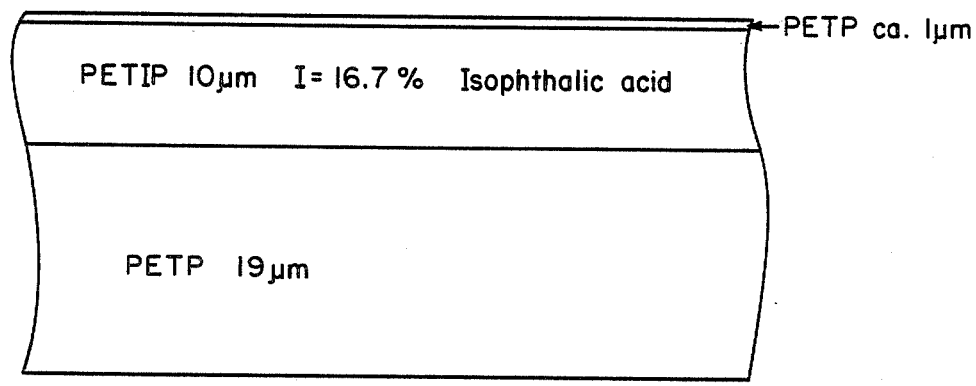
Figure 2:
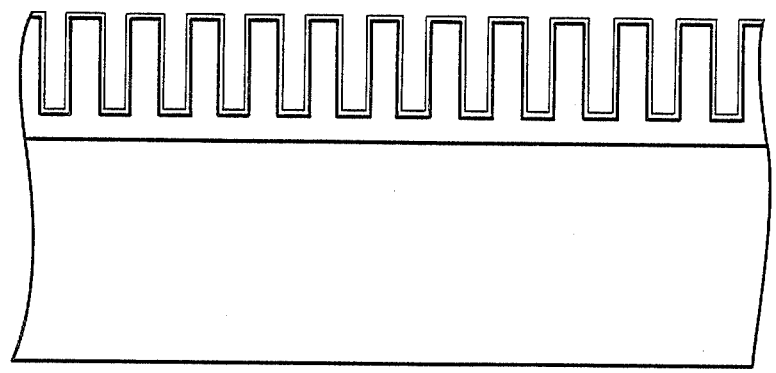

The invention provides a multilayer film of the above-described type which has two external polyester layers having sandwiched between them a lower-melting polyester layer. This multilayer film can be embossed at higher temperatures and substantially maintains the given depth of embossing during the thermal treatment which may be necessary in the further processing of the film.

In the film according to the invention, it has been found that a very good embossing behavior is obtained by covering the core layer having the lower melting point with the higher-melting polyester layers. It has also been found that the film does not tend to stick to the embossing tool during the embossing operation and that higher temperatures, which are close to the melting range of the polyester of the external layers, can be employed in the embossing operation. Moreover, the depth of embossing is maintained, even if the film is subjected to load at elevated temperatures.

The polyesters which are preferably used comprise polyethylene terephthalate which has a melting temperature in the range of between about 240° and 260° C., for forming the external layers, and a copolyester which has a melting temperature in the range of between about 190° and 230° C. for forming the intermediate layer.

The multilayer film of the invention most preferably has an asymmetric construction, i.e., the external polyester layer forming the side on which embossing is effected is preferably thinner than the second external polyester layer, arranged opposite to the embossing side. The term "external polyester layer forming the side on which embossing is effected" refers to the film layer which is brought into contact with a textured surface which is capable of transferring its texture to said film layer, while the term "external polyester layer arranged opposite to the embossing side" refers to the layer which is in contact with a non-textured smooth surface. The thickness of the multilayer film is preferably from about 5 to 350 microns, and more particularly from 10 to 200 microns. The external polyester layer on which embossing is effected has a thickness of at least about 0.01 micron, preferably from about 0.1 to 10 microns and more particularly from about 0.1 to 5 microns. The thickness of the intermediate layer is at least about 0.5 micron and is preferably comprised between about 1 and 100 microns, more particularly between about 2 and 40 microns. The second external polyester layer, which is arranged opposite to the side on which embossing is applied, has a thickness of at least about 1 micron, preferably from about 1 to 100 microns and more particularly from about 5 to 50 microns.

It ia also preferred for the copolyesters forming the intermediate layer to contain, in addition to ethylene terephthalate units, between about 5 and 95% by weight, particularly between about 5 and 50% by weight of ethylene isophthalate units.

The films are extruded, biaxially stretched and heat-set using techniques which are conventional and generally known. The three-layer film is preferably formed by coextrusion.

The present invention is explained in more detail by the following examples which are, however, not intended to be limiting.

EXAMPLE 1

A granulated polyethylene terephthalate having an intrinsic viscosity of 0.63 was introduced into a conventional coextruder and coextruded in a three layer configuration together with a granulated copolyester having an intrinsic viscosity of 0.62 and comprising 18% by weight of ethylene isophthalate and 82% by weight of ethylene terephthalate. The copolyester formed the intermediate layer between the two external polyethylene terephthalate layers. Through an adapter, the melt flows were passed into a standard slot die. The molten sheet having a thickness of 350 microns was conveyed onto a roll at 20° C., where it is cooled.

Then the film was fed into a longitudinal stretching device, and after heating the pre-film to 80° C., longitudinal stretching by 300% was effected by means of the different circumferential speeds of the driven rolls. The film which had been uniaxially stretched in the longitudinal direction was then stretched 3.3 times in the transverse direction at a temperature of 100° C. and was heat-set under tension at 220° C.

After stretching, the film had a total thickness of 35 microns, with the core layer formed of the copolyester having a thickness of 30 microns and the two external layers having a thickness of 2.5 microns each.

A hydraulic press equipped with an embossing tool was used to emboss the film under a pressure of 5 N/mm$^2$, at different temperatures, and the film was compared to the prior art (U.S. Pat. No. 3,871,947) in respect of depth of embossing and tendency to stick to the embossing tool.

The embossed films treated in this manner were placed into a drying cabinet at different temperatures for a period of 60 seconds, and the depth of embossing before and after the thermal treatment was measured by means of a surface measuring instrument (Perth-O-Meter).

EXAMPLE 2

The technology employed corresponded to Example 1; however, the film was constructed of external polyethylene terephthalate layers having thicknesses of 0.4 and 19.6 microns, respectively, and of a 15 micron thick intermediate layer of the copolyester.

COMPARATIVE EXAMPLE A

The procedure of Example 1 was repeated; however, in this case a film having only two layers (35 microns) was produced, in accordance with the state of the art (U.S. Pat. No. 3,871,947). In this film, the copolyester layer had a thickness of 25 microns.

COMPARATIVE EXAMPLE B

The procedure of Example 1 was repeated; however, a two-layer film (35 microns) was produced, in which the two layers were formed of the same polyethylene terephthalate.

As can be seen from the following tables, the reduced adherence of the film according to the invention to the embossing tool at elevated temperatures and/or its embossing depth and/or its embossing depth after a necessary thermal treatment show a considerable improvement over the prior art films.

The symbols used in the tables to define the adherence of the films to the embossing tool have the following meaning:

| |
|---|
| + adherence |
| + + strong adherence |
| + + + very strong adherence; the film is destroyed when it is removed from the embossing tool |

The embossing depth obtained in Comparative Example B is only very shallow, and embossing has completely disappeared after the thermal treatment of the film.

The films of the present invention are suitable for use according to known techniques, for transferring the embossing texture to other surfaces and for the direct use as matte decorative sheetings or as drafting films. As a result of embossing, the running characteristics in production and processing machines are, moreover, improved over those of smooth films.

TABLE 1

| | Film according to Example 1 | | | | | | |
|---|---|---|---|---|---|---|---|
| Embossing Temperature (°C.) | Adherence to the Embossing Tool | Depth of Embossing before Thermal Treatment ($\mu$m) | Depth of Embossing after Thermal Treatment ($\mu$m) Duration of Treatment: 60 seconds | | | | |
| | | | 120° C. | 140° C. | 160° C. | 180° C. | 200° C. |
| 100 | — | 20 | 14 | 12 | 10 | 8 | 8 |
| 110 | — | 20 | 17 | 17 | 15 | 10 | 10 |
| 120 | — | 26 | 22 | 22 | 20 | 18 | 16 |
| 130 | — | 26 | 23 | 25 | 25 | 20 | 19 |
| 140 | — | 26 | 25 | 25 | 25 | 22 | 21 |
| 150 | — | 26 | 25 | 25 | 25 | 24 | 23 |
| 160 | — | 26 | 25 | 25 | 25 | 25 | 25 |
| 170 | — | 26 | 26 | 26 | 26 | 26 | 26 |
| 180 | — | 26 | 26 | 26 | 26 | 26 | 26 |
| 190 | — | 26 | 26 | 26 | 26 | 26 | 26 |
| 200 | — | 26 | 26 | 26 | 26 | 26 | 26 |
| 210 | + | 26 | 26 | 26 | 26 | 26 | 26 |
| 220 | +++ | | | | | | |

TABLE 2

Film according to Example 2

| Embossing Temperature (°C.) | Adherence to the Embossing Tool | Depth of Embossing before Thermal Treatment (μm) | Depth of Embossing after Thermal Treatment (μm) Duration of Treatment: 60 seconds | | | |
|---|---|---|---|---|---|---|
| | | | 120° C. | 140° C. | 160° C. | 180° C. |
| 100 | − | 10 | 7 | 4 | 2 | 2 |
| 110 | − | 10 | 8 | 5 | 3 | 3 |
| 120 | − | 12 | 13 | 8 | 5 | 5 |
| 130 | − | 15 | 14 | 10 | 8 | 6 |
| 140 | − | 15 | 15 | 15 | 15 | 15 |
| 150 | − | 15 | 15 | 15 | 15 | 15 |
| 160 | − | 15 | 15 | 15 | 15 | 15 |
| 170 | − | 15 | 15 | 15 | 15 | 15 |
| 180 | − | 15 | 15 | 15 | 15 | 15 |
| 190 | − | 15 | 15 | 15 | 15 | 15 |
| 200 | − | 15 | 15 | 15 | 15 | 15 |
| 210 | + | 15 | 15 | 15 | 15 | 15 |
| 220 | +++ | | | | | |

TABLE 3

Film according to Comparative Example A

| Embossing Temperature (°C.) | Adherence to the Embossing Tool | Depth of Embossing before Thermal Treatment (μm) | Depth of Embossing after Thermal Treatment (μm) Duration of Treatment: 60 seconds | | | | |
|---|---|---|---|---|---|---|---|
| | | | 120° C. | 140° C. | 160° C. | 180° C. | 200° C. |
| 100 | + | 16 | 14 | 12 | 12 | 11 | 10 |
| 110 | + | 18 | 17 | 17 | 14 | 13 | 4 |
| 120 | ++ | 25 | 24 | 18 | 18 | 16 | 13 |
| 130 | ++ | 25 | 24 | 18 | 18 | 16 | 14 |
| 140 | +++ | | | | | | |
| 150 | +++ | | | | | | |
| 160 | +++ | | | | | | |
| 170 | | | | | | | |
| 180 | | | | | | | |
| 190 | | | | | | | |
| 200 | | | | | | | |
| 210 | | | | | | | |
| 220 | | | | | | | |

TABLE 4

Film according to Comparative Example B

| Embossing Temperature (°C.) | Adherence to the Embossing Tool | Depth of Embossing before Thermal Treatment (μm) | Depth of Embossing after Thermal Treatment (μm) Duration of Treatment: 60 seconds | | | | |
|---|---|---|---|---|---|---|---|
| | | | 120° C. | 140° C. | 160° C. | 180° C. | 200° C. |
| 100 | − | 2 | − | − | − | − | − |
| 110 | − | 2 | − | − | − | − | − |
| 120 | − | 2 | − | − | − | − | − |
| 130 | − | 2 | − | − | − | − | − |
| 140 | − | 2 | − | − | − | − | − |
| 150 | − | 2 | − | − | − | − | − |
| 160 | − | 2 | − | − | − | − | − |
| 170 | − | 2 | − | − | − | − | − |
| 180 | − | 2 | − | − | − | − | − |
| 190 | − | 2 | − | − | − | − | − |
| 200 | − | 2 | − | − | − | − | − |
| 210 | + | 2 | − | − | − | − | − |
| 220 | +++ | | | | | | |

What is claimed is:

1. An embossable, biaxially stretched and heat-set multilayer film, comprising:
   two external layers comprised of a first polyester composition and, sandwiched between said external layers, a core layer comprised of a second polyester composition having a lower-melting temperature than said first polyester composition, whereby the film can be embossed at higher temperatures and substantially maintains the resulting depth of embossing in a thermal treatment which is necessary for the further processing of the film after embossing with the following provisos:
   (i) that said multilayer film possess an asymmetric structure wherein said core layer is thicker than at least one of said external layers;
   (ii) that said core layer thickness is from 1 to 100 microns;
   (iii) that one of said external layers has a thickness which may range from 0.1 to 10 microns;
   (iv) that the other external layer has a thickness which may range from 1 to 100 microns.

2. A film as claimed in claim 1, wherein the external polyester layers comprise polyethylene terephthalate.

3. A film as claimed in claim 2, wherein the intermediate layer comprises a copolyester containing between about 5 and 95% by weight of ethylene isophthalate units.

4. A film as claimed in claim 1, which is embossed on one side to form a non-planar pattern.

5. A film as claimed in claim 1, wherein the intermediate layer comprises a copolyester containing between about 5 and 95% by weight of ethylene isophthalate units.

6. A film as claimed in claim 1, wherein the total film thickness is in the range from about 5 to 350 microns, with the thickness of the intermediate layer ranging from 2 to 40 microns.

7. A film as claimed in claim 1, wherein the first polyester composition has a melting temperature in the range of from about 240° to 260° C., and the second polyester composition has a melting temperature in the range of from about 190° to 230° C.

* * * * *